United States Patent [19]

Coursin et al.

[11] 3,880,144

[45] Apr. 29, 1975

[54] METHOD FOR STIMULATION AND RECORDING OF NEUROPHYSIOLOGIC DATA

[76] Inventors: David B. Coursin, 1503 Hillcrest Rd., Lancaster, Pa. 17604; Anthony Marmarou, 7 Valley Rd., Norristown, Pa. 19401

[22] Filed: Feb. 4, 1974

[21] Appl. No.: 439,245

Related U.S. Application Data

[62] Division of Ser. No. 340,560, March 12, 1973.

[52] U.S. Cl.............................................. 128/2.1 B
[51] Int. Cl.............................................. A61b 5/04
[58] Field of Search.............. 128/2 R, 2.1 A, 2.1 B, 128/2.1 R; 35/8 A, 35 C

[56] References Cited
UNITED STATES PATENTS

| | | | |
|---|---|---|---|
| 3,566,370 | 2/1971 | Worthington, Jr. et al. | 35/8 A X |
| 3,613,669 | 10/1971 | Corbin | 128/2.1 A X |
| 3,623,477 | 11/1971 | Trent | 128/2.1 B |
| 3,639,907 | 2/1972 | Greatbatch | 128/2.1 A X |
| 3,646,606 | 2/1972 | Buxton et al. | 128/2.1 A X |
| 3,706,308 | 12/1972 | John et al. | 128/2.06 R |
| 3,774,593 | 11/1973 | Hakata et al. | 128/2.1 B |

FOREIGN PATENTS OR APPLICATIONS

| | | | |
|---|---|---|---|
| 949,354 | 2/1964 | United Kingdom | 128/2.1 B |

OTHER PUBLICATIONS

Amer. Journ. of Med. Electronics, 1962, Jan.-Mar., pp. 51–57.
Med. and Biol. Engng., Vol. 8, 1970, pp. 415–418.

*Primary Examiner*—Kyle L. Howell
*Attorney, Agent, or Firm*—Browdy & Neimark

[57] ABSTRACT

Standardized stimuli of visual, auditory and somatosensory nature are precisely structured and recorded by central computer facilities on a cassette magnetic tape with these standardized recordings of electronic control signals and instructions played back by a field technician at a remote station. The electrophysiologic responses are recorded directly on a second cassette system by the remote station for later evaluation at the central computer facilities through equipment to make the information compatible with input to a computer.

7 Claims, 5 Drawing Figures

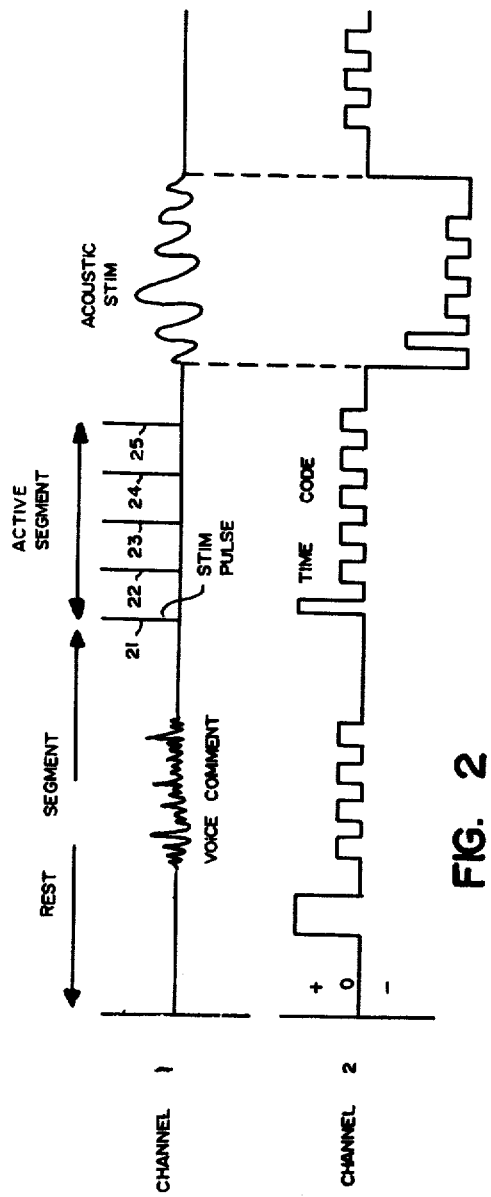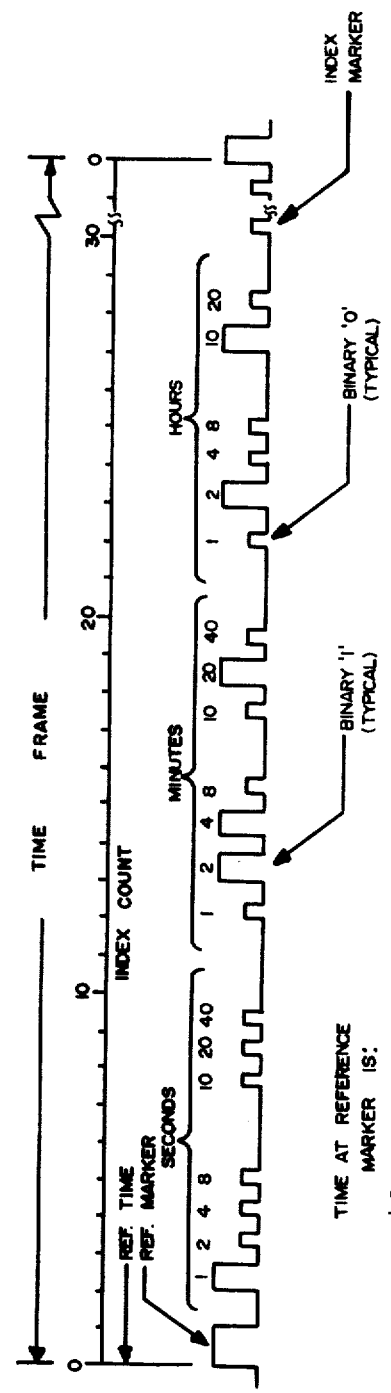
FIG. 2
FIG. 3

METHOD FOR STIMULATION AND RECORDING OF NEUROPHYSIOLOGIC DATA

This is a division of application Ser. No. 340,560, filed Mar. 12, 1973.

FIELD OF THE INVENTION

The present invention relates to a method for presenting appropriate stimuli to subjects at a remote location and recording of their electrophysiological responses with least transfer of equipment to the remote testing area.

BACKGROUND OF THE INVENTION

In the 1950's, Dr. David Baird Coursin, one of the present inventors, established a research project using electrophysiological techniques (electroencephalography and auditory evoked response) to study the process of maturation of the brain in human infants. As part of this research, he studied a number of infants who were experiencing convulsive seizures, behavioral change, and some evidence of mental retardation. These subjects were eventually found to be receiving a diet of infant formula in which the amount of vitamin $B_6$ was reduced to a borderline deficient level. This marginal single nutrient deficiency altered the activity of a number of brain enzyme systems resulting in the clinical picture just described.

Using biochemical, electrophysiological, and clinical techniques, Dr. Coursin was able to demonstrate conclusively the relationship of the borderline deficiency of this single nutrient to the neurochemical changes that caused derangements in the patient's neurophysiology (electroencepholograph and auditory evoked response) and the appearance of abnormalities in performance. This triad of interaction has become one of the classical demonstrations of the interrelationship of neurochemistry with neurophysiology and clinical behavior.

As a result of these discoveries, extensive studies were undertaken using electrophysiological techniques (resting electroencepholograph and evoked response EEG) to monitor the effects of neurochemical change. Research in a number of laboratories has clearly shown that this approach is valuable in linking the neurochemical states of the brain to the individual's clinical capability and performance.

In the course of studying these problems, Dr. Coursin extended his concept of the effect of single nutrient deficiency to include the broader scope of general malnutrition. His studies took him to Central America for the purpose of evaluating mental development in populations at nutritional risk. There he found supporting evidence of this concept in impoverished situations in which the deficiency of single and/or multiple nutrients along with deprived psycho-social conditions impaired the normal development of clinical capability and performance in children.

Other workers have recognized the importance of electrophysiological studies in man and have used the standard paper tracing electroencephalograph as part of their research studies in several underdeveloped areas of the world. Their findings routinely have shown the subject's electroencephalogram to be abnormal in the malnourished state and to improve toward normal with dietary therapy. However, there have been no long-term follow-up studies of these findings, nor have there been any in which the more recent computer techniques for analysis of electrophysiological data have been used.

A single exception to this situation has been one study in Sendai, Japan, in which photic evoked response and frequency analysis were undertaken in a well nourished population of children and compared with one in a malnourished population in the mountainous areas of that country. Publication of this data by Dr. Arakawa and his staff along with Dr. Coursin (Arakawa, T., Mizuno, T., Chiba, F., Sakai, K., Watanable, S., Tamura, T., Tatsumi, S. and Coursin, D. E.—"Frequency Analysis of Electroencephalograms and Latency of Photically Induced Average Evoked Responses in Children with Ariboflavinosis," Tohoku J. Exp. Med., 94 327, 1968) represents the only study of its kind in the literature. Furthermore, The technical difficulties in moving the appropriate complex, expensive equipment to the site of the malnourished populations and the difficulties in obtaining tracings preclude other studies of this nature from being readily undertaken.

Several international meetings have reaffirmed the tremendous need for further research in this area, for development of appropriate equipment, and for standardization of techniques that would permit comparisons of findings from different parts of the world. It is well established that the normal process of mental growth and development is reflected in the maturation of the electroencephalogram; that various states including malnutrition cause abnormalities both in the tracing per se as well as in their maturational sequence; and that the success of therapy can be detected by the improvement of these tracings.

At present, there are an estimated 400,000,000 children exposed to nutritional risk throughout the world. They range from severely malnourished youngsters that represent some 3 to 4% of the total to mild and moderate degrees of severity that comprise the remainder. Depending upon the time of onset, severity, type and duration of malnutrition, the mental development of these individuals may be impaired to the degree of reducing their eventual performance potential by some 10 to 20%. Under these circumstances, malnutrition becomes of major critical importance to the eventual capability of the individual, his capacity to contribute to the well-being of himself, family, community, and nation. As such, this problem is presently recognized as one of major consequence throughout the world.

Unfortunately, the multidiscipline nutrition research projects in this country and abroad do not have the necessary expensive apparatus at hand, nor the specially trained personnel to operate these projects. Furthermore, the environmental conditions within which studies would have to be undertaken could often render the recording apparatus unstable and the results questionable.

Conversely, major medical facilities that do have the appropriate equipment and personnel are routinely located in major centers in affluent areas that are far removed from malnourished populations in which studies of this nature could be undertaken. It has been against this background that the present inventors have endeavored to develop a means for bringing the electrophysiologic techniques to the field and acquiring electrophysiologic data in a manner which would not require the transfer to the field locus of massive electronic equipment or highly skilled electronics personnel.

SUMMARY OF THE INVENTION

The system of the present invention was designed to provide an economical and convenient means of data acquisition, control and storage in a field installation where more complex electronic equipment is not available.

The functions of the system of the present invention are accomplished by providing a convenient method of presenting timed, visual, acoustic and somatosensory (sensory pathways associated with the striated skeletonal musculature of body and limbs) stimuli to a test subject; integrating the control of the stimuli generators used in the test; recording two channels of the electrophysiologic data and three channels of behavioral events on magnetic tape; and providing a means of displaying time code information onto a strip chart recorder.

It is, accordingly, an object of the present invention to overcome the deficiencies of the prior art, such as indicated above.

It is another object of the invention to obtain an evoked response EEG in the field at a remote locus without complex equipment.

It is another object of the present invention to allow data acquired in the field to be subjected to the most sophisticated analysis for obtaining an assessment of the individual's electrophysiological status. This information is then to be transmitted to the nutrition research organization that would correlate it with other information obtained from multidiscipline studies of food composition, dietary intake, medical status, sociology, phychology, biochemistry, anthropometry, behavioral performance responses, etc.

It is a further object of the present invention to define a procedure which would provide a means for bringing the important dimension of electrophysiological stimulation and recording to several populations under study both in this country and abroad that heretofore have not been availed of this valuable technique and to add an entirely new facet to the capabilities of assessing the status of this parameter and correlating it with the numerous other factors that affect the individual's mental well-being and capability.

Basically, the invention comprises a method involving the production of a programmed tape with voice comment, stimulus pulses, and acoustical stimulus, with time code pulses on a second channel, playing this tape through a main control unit to stimulus generators and an electroencepholograph unit with vocal instructions to a field technician and coding of the evoked responses onto another tape for transport to a computer center where this second tape is played and the information prepared for use in a computer.

A strip chart from the EEG unit is coordinated with this information at the computer center.

BRIEF DESCRIPTION OF THE DRAWING

The above and additional objects and advantages inherent in the present invention will become apparent by reference to the description of an illustrated embodiment and drawing thereof of which:

FIG. 2 illustrates the pulse forms on the program cassette tape played at the remote station;

FIG. 3 illustrates a pulse binary code marking used on a strip code recorder;

DESCRIPTION OF THE PREFERRED EMBODIMENT

The function of the central facility 10 is to coordinate the experimentation and acquisition of data for analysis of neurophysiological status.

Figure 1:
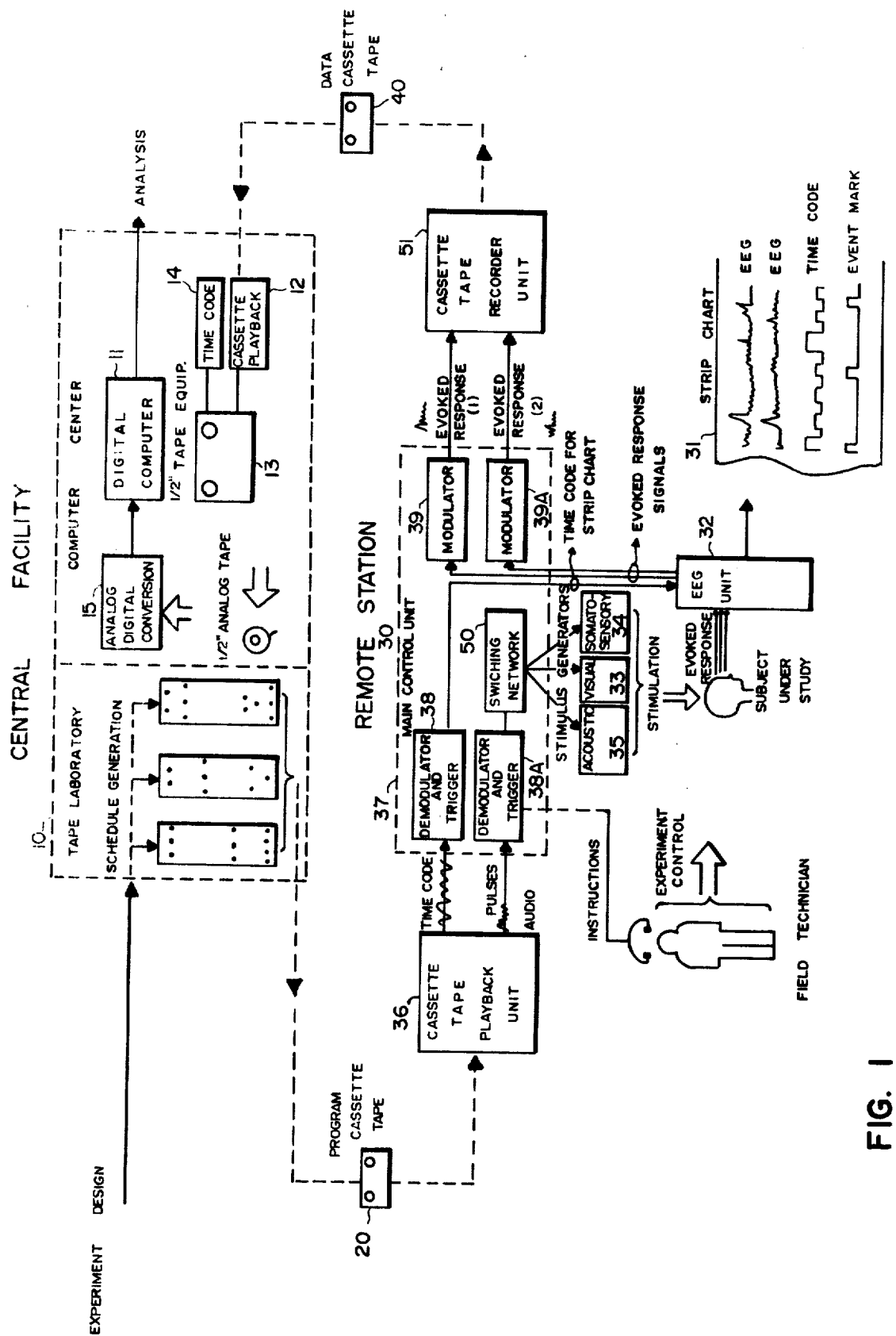
FIG. 1 illustrates the overall system of information flow and the apparatus involved.

As shown in the overall system diagram in FIG. 1, a program cassette tape 20 is made in the tape laboratory schedule generation section of central facility 10 in accordance with a designed experiment. This cassette tape 20 is taken for use at a remote station 30 where a field technician tests the subject under study. A data cassette tape 40 is made along with a strip chart 31 from an electroencepholograph (EEG) unit 32 and data cassette tape 40 along with other data cassette tapes 40 made from program cassette tape 20 with other subjects tested at remote station 30 are sent back to central facility 10 to the computer center section for use in digital computer 11 and analysis by interested organizations such as nutrition research organizations which have shown a great interest in such data.

The following information is generally placed on the tape of program cassette tape 20 at the tape laboratory schedule generation section of central facility 10.

The precise timing of all visual, auditory, and somatosensory stimulation and their order of presentation.

The magnitude and duration of all visual, auditory and somatosensory stimuli.

A continuous indication of elapsed time from start of the test schedule to completion.

All instructions and commands for controlling the electronic equipment for presentation of stimuli to the subject under study and the recording of the neurophysiologic response.

All of this information is condensed and processed on two channels of a standard cassette tape 20 by the facilities of central facility 10. This permits the use of commercially available "stereo" equipment for playback and recording at remote station 30.

The facilities of central facility 10 include a time code generator controlled by a digital computer (now shown so connected) which is used to generate groups of pulse trains at precise intervals according to a specified experimental design. The formate of signals for program cassette tape 20 is shown in FIG. 2. A "rest" segment in channel 1 contains no pulses. An active segment in this same channel 1 contains positive pulses of 3.0 volts amplitude and 1.0 ms. duration. The intervals between pulses as well as the spacing between active and rest segments are controlled by the computer. Each of positive pulses 21–25 when played back at remote station 30 will be used as a signal to trigger either visual stimulus generator 33 or somatosensory stimulus generator 34. Each active segment is preceded by a rest segment. Instructions to the field technician will be prerecorded onto the same track of channel 1 during the "rest" segment. These instructions will describe to the field technician the type of active segment that will follow and the position of all electronic controls necessary to implement the proper stimulus presentation of the visual and somatosensory stimuli. These instructions will be recorded at a 1.0 volt level so that they will not interfere with the decoding at the remote station 30 of the actual stimulus pulses. Auditory stimulation consisting of pure tones, clicks, or synthetic vowels of varying duration are generated by equipment at central facility 10 and recorded on channel 1 for direct playback at remote station 30 through acoustic stimulus generator 35.

In summary, channel 1 of the program cassette tape 20 will contain audible instructions for control of equipment, groups of positive 3.0 volt pulses for signaling the onset of either visual or somatosensory stimuli, and auditory signals for direct presentation of acoustic stimuli.

The remaining track, channel 2, of the cassette tape 20 contains elapsed time information. The auxiliary output of a time code generator located at the central facility provides a pulsed binary code for use on strip chart recorder used with EEG Unit 32.

The code as illustrated in FIG. 3 is composed of a reference marker and three subcode words of seconds, minutes and hours. Each sub-code word is weighed in binary coded decimal fashion. An up-dated time frame is produced every 10.0 seconds. This code permits the remote station 30 to retain a strip chart measure on strip chart 31 of the precise experimental elapsed time in hours, minutes and seconds by observing the height of the marker pulses within each time frame according to FIG. 3.

This information is conveyed to remote station 30 by the cassette tape 20 in the following manner. Since direct recording methods cannot be used to record d.c. level shifts, a frequency modulation-demodulation technique is employed. The time code output voltage of a time code generator located at central facility 10 is used to modulate a voltage controlled oscillator. The center frequency of the voltage controlled oscillator (vco) is adjusted to 3.5 kc. Maximum d.c. level of the time code generator will shift the vco to 2.5 kc. Therefore, voltage swings from 0 volts to 1.0 volt from the time code generator will shift the carrier frequency from 3.5 KHZ to 2.5 KHZ. This frequency range is well within the bandwith of commercial direct recoding systems (60 HZ - 10 KHZ).

The modulated carrier of the voltage controlled oscillator is recorded simultaneously on channel 2 of the cassette tape 20 while the stimulus schedule is recorded on channel 1. The time code channel is demodulated during the play back mode at the remote facility 30 and the d.c. level shifts as shown in FIG. 3 are reproduced on the remote facility strip chart 31. The time code level shifts extend from zero to a positive voltage. Negative excursions in d.c. level are used for pre-recording event markers for auditory stimuli shown in FIG. 2. This is accomplished by the central facility 10 in the following manner. The computer signal which regulates the recording of acoustic stimuli on channel 1 is used to shift the carrier frequency of channel 2 from 3.5 KHZ to 4.5 KHZ for the duration of the acoustic stimulus (1.0 to 3.0 sec.). This is accomplished by regulating the output of an operational summing amplifier which controls the frequency shift of the voltage controlled oscillator. The voltage controlled oscillator is modulated by the sum of the output voltage of the time code generator and the computer signal which is present during acoustic stimulus recording. Channel 2 of cassette program tape 20 then contains two forms of information upon demodulation; positive voltage excursions reproduce the time code of FIG. 3 while negative voltage excursions represent onset and duration of acoustic stimulation.

Remote station 30 receives program cassette tape 20 and under the direction of this tape performs the following functions:

A. Conducts the neurophysiologic experiment according to pre-recorded instructions on program tape 20.
B. Provides the necessary clinical support for subjects under study.
C. Records the evoked responses from the subject via a duplicate cassette tape system.
D. Sends the data cassette tape 40 along with a sample strip chart recording 31 back to central facility 10.

The equipment contained within remote station 30 includes:

A. A dual channel cassette tape playback unit 36 for playback of program tape 20.
B. A main control unit 37 containing demodultors 38 and 38A, modulators 39 and 39A and switching network 50 for decoding and recording purposes.
C. Generators 33, 34 and 35 for presentation of visual, somatosensory, and acoustic stimulation respectively.
D. A dual channel cassette tape recorder unit 51 for recording of neurophysiologic data.
E. A suitable electroencephalograph unit 32 for acquisition and recording of EEG activity.

The investigator or field technician at remote station 30 will receive program cassette 20 which contains the prerecorded experimental schedule and voice commentary on channel 1 and the time code and event markers on channel 2 as illustrated in FIG. 2.

Both channels are routed from cassette tape playback unit 36 to the main control unit 37. The stimulus channel does not require demodulation since information on this channel is a combination of pulse and direct mode recording. This channel is fed to a trigger network 38A which detects the presence of a stimulus pulse and converts each stimulus pulse to a square pulse of uniform height and duration. The square pulse is directed to either the external acoustic generator 35, visual generator 33, or somatosensory generator 34 by a simple switching network 50 positioned by the field technician. This square pulse serves as the trigger signal for activation of a single stimulus presentation. The positioning of switching network 50 is made in accordance with the instructions contained in the "rest" segment of program tape 20.

The second channel, or time code track is first demodulated by the main control unit 37 and then routed to the EEG unit 32 for strip chart presentation.

The electroencephalographic signals in response to stimulation are detected by scalp electrodes and amplified by the EEG unit 32. The electrical outputs of each EEG channel are routed to a strip chart recorder for visual observation. Usually several FEG channels are available for strip chart recording. Two of these channels are selected for magnetic tape cassette storage. These two channels are routed to the main control unit modulator networks 39 and 39A. The frequency content of the EEG signals varies between 0.5 and 60 HZ. Since this frequency band is well below the response of direct recording equipment, a frequency modulation technique must be used. The modulators 39 and 39A will be described in greater detail below. They are of identical design to those used in the production of the program tape 20. A voltage controlled oscillator of 3.5 KHZ center frequency is used. The EEG signals are adjusted to vary in amplitude between + and − 1.0 volt. This corresponds to a frequency deviation between 2.5 and 4.5 KHZ. The output of modulators 39 and 39A are recorded on the cassette data tape recorder unit 51 according to the instructions on the program tape 20. The data cassette 40 along with a sample of the strip chart recording 31 is then transferred back to central facility 10.

Main control unit 37 at remote station 30 is capable of recording three event channels in addition to the two physiologic continuous data channels. The form of the event can be either an electrical pulse or an external switch closure. Those events corresponding to activation of the stimulus generators 33 − 35 are of electrical nature while other events such as behavioral changes or responses are indicated by external switch closures by the field technician.

Figure 5:
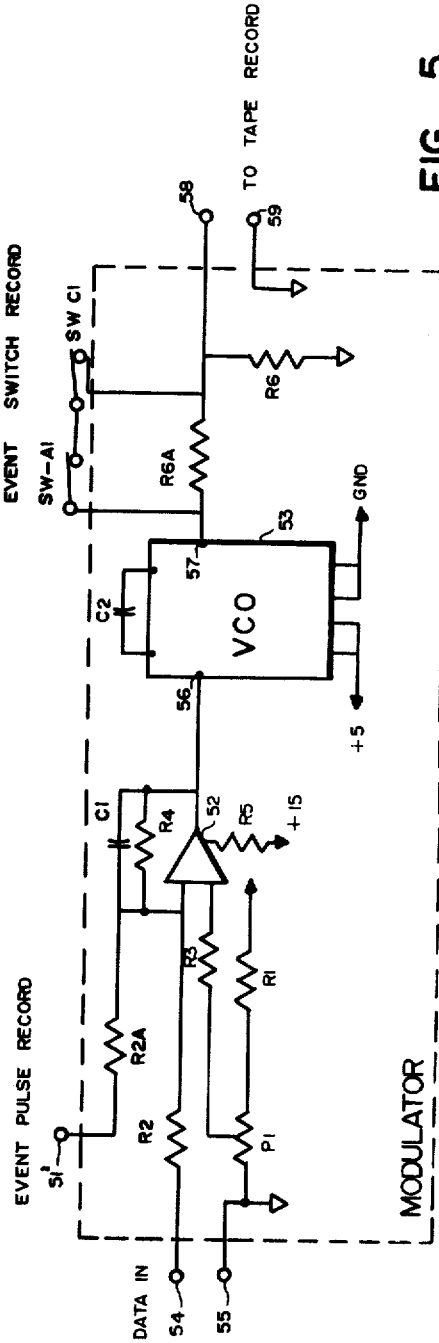
FIG. 5 is a circuit and block diagram of a modulator used in the overall system.

When it is desired to record a short term electrical event (stimulus onset), the electrical pulse from an external device is routed to the event pulse record terminal 51 of the modulator 39 having the circuit shown in FIG. 5. The electrical pulse is added to the physiologic data channel by the summing amplifier 52 via resistor R2A. The output frequency of the vco module 53 will be shifted in proportion to the amplitude of the electrical event pulse and for a time period equal to the duration of the event pulse. This instantaneous shift in frequency is later detected by the computer 11 at central facility 10 upon playback of the data cassette tape 40. FIG. 5 illustrates circuitry of one of the modulators which differs from the other modulator only by having an event pulse record terminal and associate circuitry connecting that terminal to summing amplifier 52 which amplifies is found in both modulators.

Figure 4:
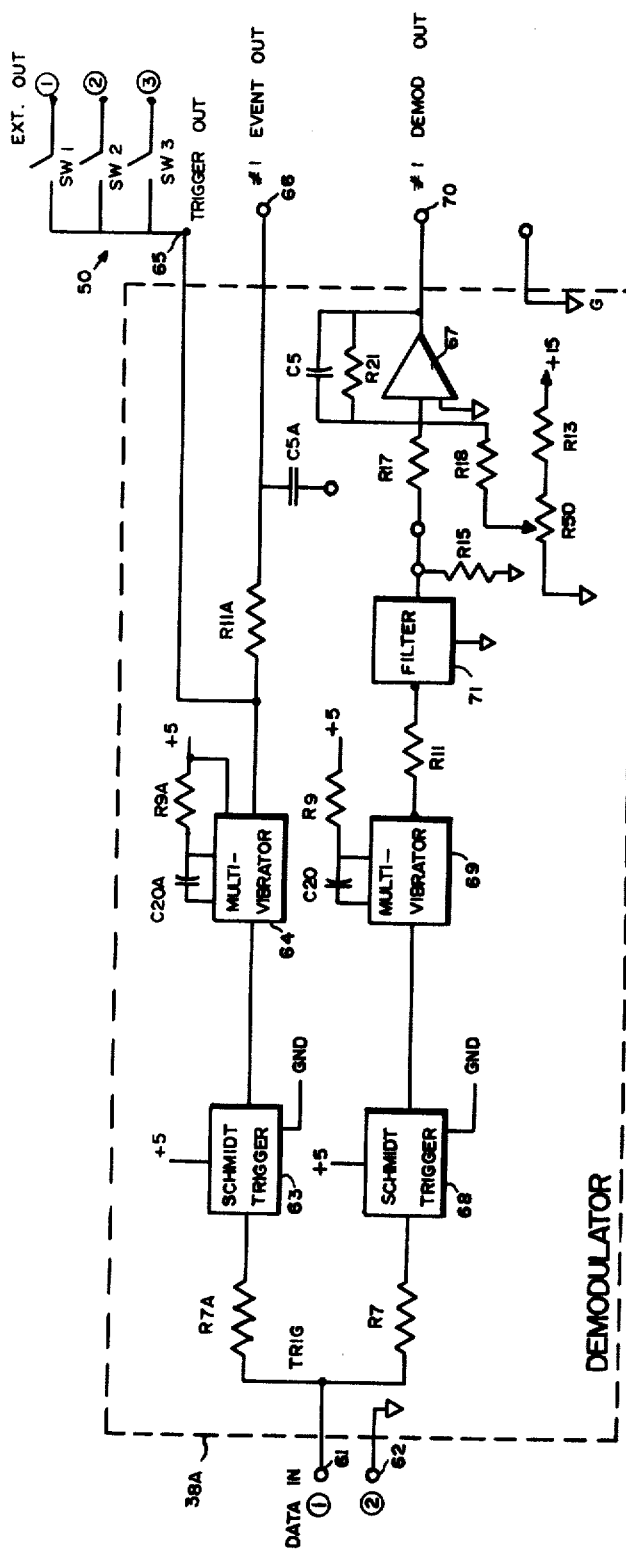
FIG. 4 is a circuit and block diagram of a demodulator and trigger unit.

Signal pulses that are pre-recorded on the program tape 20 are detected by the trigger circuits of the demodulator 38 and 38A shown in circuit form by the demodulator of FIG. 4. FIG. 4 illustrates demodulator 38A which differs from demodulator 38 by its connection to switching network 50. When the demodulator is used in conjunction with the program tape 20, the pre-recorded pulses appear at the data input terminals 61 and 62. These pulses are routed to a Schmidt Trigger 63 thru resistor R7A. The pulse is lengthened to 100 m. sec. by a one-shot multi-vibrator 64 and the 100 m. sec. pulse is made available at the Trigger output terminal 65 of the demodulator 38A network. The trigger pulse is then routed to one of three external stimulus generators 33 − 35 via a mechanical switch network 50 (SW 1, SW 2, SW 3). The event output terminal 66 is used for sensing physiologic event activation at the central facility 10 in a similar demodulator during data processing as described previously.

Behavioral events such as fixation, unusual body movement or a response score can be recorded at the remote station 30 by manual activation of event switch SW−A1 of the modulator circuit of FIG. 5. Switch A1 places resistor R6A in series with the output terminal to the cassette data recorder unit 51 and the signal will be attenuated in amplitude by a fixed amount. This reduction in the amplitude of the tape signal is sensed by the modulator circuit during playback of the data tape. The data signal from the tape 20 which appears at input terminals 61 and 62 of the demodulator network is routed to the trigger network 63 via resistor R7A. The resistor R7A is adjusted by the central facility 10 such that Schmidt trigger 63 is not activated during the time period of the reduced amplitude signal. Therefore, when an event has been recorded by the remote station 30, the voltage at event output terminal 66 of the demodulator circuit (FIG. 4) will be reduced for the duration of the recorded event. Since there are two physiologic data channels, similar amplitude reductions can be made on both channels. Three types of events can be recorded by the remote station 30 by adopting the following convention. Reduction of amplitude of channel 1 (activation of Switch SW−A1) indicates event type 1. Reduction of amplitude of channel 2 by activation of a switch connected similarly to switch SW−A1 but on the other modulator indicates event type 2. Simultaneous reduction of amplitude on both data channels (activation of Switch SW−C1) found on both modulators 39 and 39A indicates event type 3.

The computer at the central facility is programmed to detect amplitude changes on both channels and will indicate which form of event (1, 2 or 3) has been recorded by remote station 30. The recording of events does not interfere with the normal demodulation of the two physiologic data channels since this information appears as a change in frequency while event data corresponds to changes in amplitude.

Data cassette 40 from remote station 30 is played back thru similar demodulator networks in cassette playback unit 12 to retrieve the two channels of EEG information. The outputs of the demodulators are recorded on ½inch analog tape or tape equipment 13 along with a synchronized time code from unit 14 for elapsed time identification. The ½inch analog tape is then converted to digital formate in analog to digital conversion unit 15 and fed to the central laboratory computer 11. The information gathered by remote station 30 is now in a compatible form for subsequent computer analysis. The analytical techniques will include spectral characterization, conventional averaging processes and other statistical treatments that are appropriate for the project at hand.

The purpose of the cassette tape system and the main control unit is to provide a convenient, economical means of implementing the presentation of a rather complex experimental schedule and storing two channels of physiologic data in an environment where more sophisticated electronic personnel and equipment are not available. Further, by regulating the presentation of stimuli according to a pre-recorded set of electronic instructions, uniformity of data acquisition is enhanced and less technical responsibility is required by members of the investigative team. The discussion thus far has centered on an overall view of the data processing network and the interfacing of central and remote stations. A more detailed description of an electronic nature including the operation and design of the essential components of the main control unit is given below.

Main control unit 37 contains all electronic circuitry for implementing the experimental protocol with exception of the external stimulus generators 33 − 35 and cassette recorder units 36 and 51. The major components of the main control unit are the modulators 39 – 39A, demodulator and trigger units 38 – 38A, and switching network 50. The modulators 39 – 39A are used for recording the EEG data. The demodulator trigger networks 38 – 38A are used for decoding program tape 20 into suitable pulses for activation of stimulus generators 33 – 35 and playback of the special time code track onto a strip chart record 31. The demodulator networks 38 – 38A can also be used for playback of the neurophysiologic data channels at remote station 30. Each circuit is considered separately.

The modulator circuit of FIG. 5 consists of an operational amplifier 52, (i.e, Philbrick model 85 AU) and an integrated circuit voltage controlled oscillator 53 (i.e. Motorola MC 4024). The electrical voltage output of the EEG driver amplifier of EEG unit 32 is inserted at input terminals 54 and 55. This signal amplitude will vary between the range of ±1.5 volt. The frequency content fluctuates between the range of 0.5 to 60 HZ. The EEG signal at terminals 54 and 55 must be adjusted so that the positive and negative excursions are within the linear operating range of the voltage controlled oscillater 53 (VCO). This adjustment is accomplished by the operational amplifier 52. Resistors R2 and R4 attenuate the incoming signal at terminals 54 and 55 such that an optimum operating range of the VCO 53 is used when ±1.414 (1 volt RMS) appears at the input terminals 54, 55. This usually will occur upon maximum positive and negative pen deflection of the EEG strip chart channel. Resistors R1, P1 and R3 make up a balance network for adjustment of the center frequency of the VCO 53 when terminals 54 and 55 are shorted. This zero volt condition corresponds to positioning the EEG strip chart pen at center scale. Resistor R5 is used to trim the internal offset of operational amplifier 52. Capacitor C1 in combination with R4 and R2 attenuates high frequency noise above 10 KHZ.

The output of amplifier 52 is routed to VCO 53 via pin 56 of VCO 53. Capacitor C2 adjusts the operating center frequency of VCO 53. Capacitor C2 is selected such that the center frequency equals 3.5 KHZ for zero input voltage at pin 56. The output of VCO 53 appears at pin 57 of the VCO 53 and consists of a square wave pulse train of 5.0 volt amplitude and 3.5 KHZ. Resistor R6 is used as a fixed load to stabilize VCO 53. The output frequency at pin 57 varies from 2.5 KHZ to 4.5 KHZ for ±1.414 vdc at input terminals 54 and 55. The output of VCO 53 is available at junction points 58 and 59 for direct connection to the record terminals of the cassette tape unit 51 (i.e., Wollensak Model 4700).

The two modulator circuits 39, 39A contained within the main control unit 30 are identical in design except for input 51' on one modulator. Operating +5.0 and ±15.0v power is derived from commercial power supply modules contained within the main control unit but not shown in FIG. 1.

The demodulator and trigger networks, of which one is shown in FIG. 4, are also housed within main control unit 37. The circuit contains four major components; a Schmidt Trigger 63 (i.e., Motorola IC 9709), a one-shot multivibrator 64 (i.e., Motorola 851P), a low pass filter 71 (i.e., UTC–LPM 200) and an operational summing amplifier 67 (i.e., Philbrick 85AU). The output of the cassette tape recorder 36 is routed to input terminal 61. The signal consists of a uniform amplitude sine wave (2.0 vrms) modulated in frequency within the range of 2.5 to 4.5 KHZ. Resistor R7 acts as an input resistor to the Schmidt Trigger 68. The output of the Schmidt Trigger 68 will swing from zero to +5.0 volts when the input voltage at pin 61 exceeds 1.5 volts. Therefore, a square wave pulse train will be produced at Schmidt Trigger 68 output of uniform 5.0 v amplitude. The frequency will track the frequency of the input sinisoidal signal of pin 61.

The output of the Schmidt Trigger is directly coupled to a one shot multivibrator 69. Resistor R9 and capacitor C20 adjust the duty cycle of the one shot multivibrator for 50 percent at an incoming center frequency of 3.5 KHZ. The output of the one shot multivibrator 69 is directly coupled to a low pass filter 71 via resistor R11. The low pass filter 71 attenuates all frequencies greater than 200 HZ. The signal across load resistor R15 is equal to zero for zero frequency modulation. Therefore, the original EEG signal varying between 0 and 200 HZ will appear across R15.

Amplifier 67 increases the amplitude of the demodulated signal to ±1.414 volts at output terminals of units 38, 38A for an incoming frequency deviation of 2.5 KHZ to 4.5 KHZ at input terminals 61 and 62. Resistors R17 and R21 adjust this gain while capacitor C5 attenuates high unwanted frequencies. Balance network R18, R13 and R50 adjust the amplifier output to zero volts for zero frequency modulation. R23 is used to trim the internal offset of operational amplifier 67. The output of the demodulator is now available at pins 70 for connection to an external device such as the EEG unit 32 for strip chart playback or to other signal processing equipment.

As can be seen from the above discussions the units required in the remote station 30 are commercially available and of considerably less bulk than any equipment which has previously been used for the gathering of data and making the studies discussed here.

It will be obvious to those skilled in the art that various changes may be made without departing from the scope of the invention and the invention is not to be considered limited to what is shown in the drawing and described in the specification.

What is claimed is:

1. A method of collecting neurophysiological data at a remote station in a form for analysis of said data comprising the steps of:

recording electronic control signals and audio instructions on a first tape at a processing facility away from said remote station;

playing back said first tape at said remote station;

operating stimulus generators in accordance with instructions on said first tape at said remote station;

recording electronically the physiologic or behavioral response on a strip chart and on a second tape at said remote station; transferring the responses on said second tape at a processing facility onto recording means compatible for feed into a computer;

and analyzing the material fed to said computer.

2. The method of collecting neurophysiological data of claim 1, further characterized by recording a time code on a different channel on said first tape from said recorded electronic control signals and audio instructions.

3. The method of collecting neurophysiological data of claim 2, further characterized by inserting a time code signal into said recording means while transferring signals on said second tape at a central facility.

4. The method of collecting neurophysiological data of claim 1, further characterized by
recording an acoustical stimulus signal on said first tape at said processing facility,
and activating an acoustic stimulus generator at said remote station with said first tape.

5. The method of collecting neurophysiological data of claim 1, further characterized by
producing visual and somatosensory stimuli with said stimulus generators.

6. The method of collecting neurophysiological data of claim 1, further characterized by
said computer being a digital computer
and the step of converting the signals on said recording means from analog to digital signals.

7. The method of collecting neurophysiological data of claim 1, further characterized by
analyzing the material on said strip chart while analyzing the material fed to said computer by coordination of both forms of information.

* * * * *